May 2, 1939.  E. G. BAKER  2,156,749
ROTARY VALVE ENGINE
Filed April 4, 1936
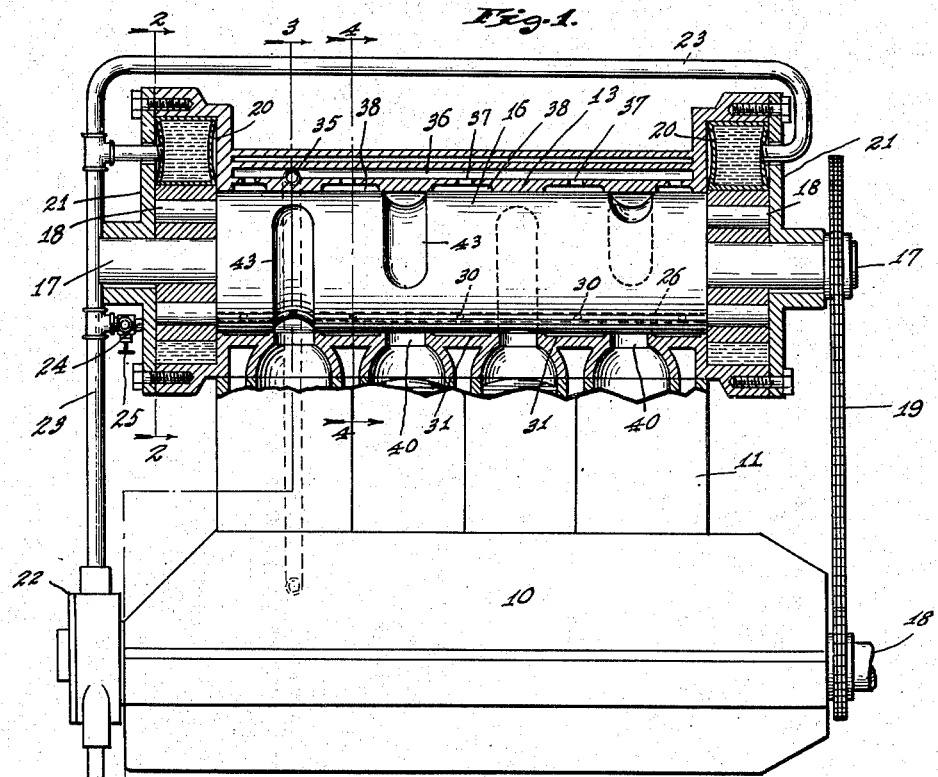
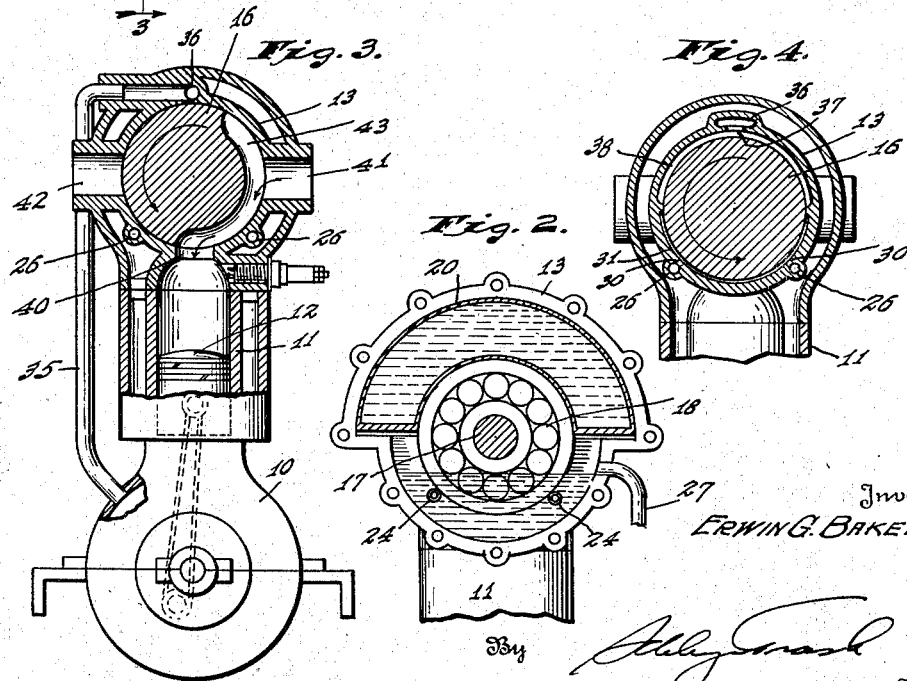
Inventor
ERWIN G. BAKER,
By
Attorneys Patented May 2, 1939

2,156,749

UNITED STATES PATENT OFFICE 2,156,749

ROTARY VALVE ENGINE

Erwin G. Baker, Indianapolis, Ind.

Application April 4, 1936, Serial No. 72,715

4 Claims. (Cl. 123—190)

This invention relates to internal combustion engines of the rotary-valve type, and has for its broad object the production of such an engine which will be an improvement over prior rotary-valve engines. More specifically, it is my object to produce a rotary valve which will not deteriorate rapidly under the conditions of wear and high temperature to which it is subjected in use. Another object of my invention is to provide an improved means for holding the valve against its seat under explosion pressures and thereby to reduce leakage and increase efficiency. Still another object of my invention is to provide a novel means of lubricating the valve.

In carrying out my object, I form the roller of carbon, preferably carbon of the type used as electrodes in electric furnaces, and I thoroughly impregnate this carbon with oil. I find that a valve of carbon so treated is exceptionally resistant to wear and to the action of hot gases. The valve is suitably mounted for rotation in floating bearings forced toward the cylinder or cylinders to hold the valve in engagement therewith by means of liquid-filled vessels with resilient walls, the pressure within which may be maintained sufficiently great to keep the valve seated at all times. To lubricate the valve, I provide a conduit extending from above the oil level in the engine crankcase to the top of the valve, such conduit serving to convey oil in the form of mist from the crankcase to the valve.

The accompanying drawing illustrates my invention: Fig. 1 is a side elevation of a four-cylinder engine to which my invention has been applied, parts of the engine being broken away to illustrate more clearly the interior construction; and Figs. 2, 3, and 4 are transverse vertical sections on the lines 2—2, 3—3, and 4—4 of Fig. 1.

The four-cylinder engine shown in the drawing is merely illustrative, as my invention obviously is not limited to engines of any particular number of cylinders. The drawing is to be interpreted as illustrating the valve mechanism and its lubricating means, and not as showing any particular arrangement of parts which would affect the valve timing.

Except for its head, which contains the valve mechanism, the engine shown in the drawing is of the conventional type, including a crankcase 10, a cylinder block 11, and pistons 12. The head 13, which may contain combustion chambers and spark plugs, is secured in any convenient manner to the top of the block 11 and has a central longitudinal bore for the reception of the rotary valve 16. The cylinder block 11 and head 13 may be and preferably are water jacketed, as indicated.

At each end, the head 13 is recessed, and through the recesses there extend journal portions or shafts 17 which are rigid with the valve 16. One of the shafts 17 is operatively connected to the engine crank-shaft 18 as by the chain and sprocket drive 19 illustrated in the drawing.

Each projecting shaft 17 is received within a bearing, preferably anti-friction bearing 18, and in the upper part of the recess in each end of the cylinder head there is disposed a generally semi-circular hollow vessel 20 the inner surface of which is curved to fit the outer face of the bearing 18 and the outer surface of which bears against the top portion of the recess wall, as is clear from Fig. 2. The vertical walls of the vessels 20 are shaped to be non-planar, as by being made concave, in the manner illustrated in Fig. 1. Such side walls permit relative radial movement between the inner and outer arcuate walls of the vessel.

The vessels 20 are connected with some suitable source of fluid under pressure. Preferably this source is a pump 22 driven by the engine and having an outlet connected through a pipe 23 to the vessels 20. The vessels 20 and the bearings 18 may be protected by cover plates 21 which are secured against the ends of the head 13 and through each of which the associated pipe 23 and shaft 17 extend. The openings in the covers 21 which pass the branch of the pipe 23 and the shafts 17 are of sufficient vertical extent to permit a slight degree of vertical movement of the pipe branches and shafts.

Preferably, oil is used as the fluid in the vessels 20, and a portion of the oil discharged from the pump 22 may be used for lubricating the moving parts in the head. To this end, the pipe 23 may be provided with a branch 24 having a valve 25 and discharging into one of the recesses at the ends of the head. The two recesses are interconnected by passages 26 which extend longitudinally through the head on each side but well below the axis of the valve 16. An overflow pipe 27 connected with one of the recesses maintains the oil level in both substantially constant, the inlet for the overflow pipe 27 being high enough so that the lower portion of each of the bearings 18 is immersed in the oil.

At points along its length, each of the passages 26 is provided with inwardly directed openings 30 communicating with oil-containing recesses 31 in the wall of the valve-receiving bore of the cylinder head. These recesses are located between the cylinder ports and extend circumferentially for a considerable distance in each direction from the bottom of the valve. Additional lubrication for the valve may be provided by a conduit 35 which extends upwardly from the crankcase 10 to communicate with a passage 36 formed in the head 13 above the valve. The passage 36 is provided at intervals along its length with openings 37 communicating with recesses 38 generally similar to the recesses 31 in the bottom surface of the head bore. In the operation of the engine, an oil mist will form in the crank-case, and a portion of this mist will be conveyed through the conduit 35 and passage 36 to the recesses 38.

For each of the cylinders, the head is provided with a cylinder port 40, an inlet port 41, and an exhaust port 42. It is to be understood of course that the exhaust ports and inlet ports will be connected to suitable manifolds, although such manifolds are not shown in the drawing. The ports 40, 41, and 42 are all located in the same plane transverse to the valve axis, and in this plane the valve is provided with a circumferentially extending passage 43 by means of which communication of the cylinder port with the exhaust and inlet ports is controlled. Each of the passages 43 is formed with rounded ends and smoothly curved sides so as to reduce to a substantial minimum the resistance which it offers to the flow of gas. I find that in order to obtain ports 40, 41, and 42 large enough to avoid undue restrictions of the gases flowing through them and in order to obtain valve passages 43 of adequate cross-sectional area and length it is desirable to employ a valve of a diameter materially larger than that of the cylinder.

I find that with the valve arrangement illustrated in the drawing I can depart with advantage from the conventional valve-timing used in internal combustion engines of the automobile type. Thus, I can defer the exhaust opening until near the end of the explosion stroke, or even to a point beyond the end of the explosion stroke; and, in addition, I can have a substantial degree of overlap between the opening of the inlet valve and the closing of the exhaust valve.

In the engine shown in the drawing, it is intended that the valve 16 will operate at half crank-shaft speed so that it will make one complete revolution for each cycle of engine operation. My invention is not to be understood as limited to this arrangement, however, as I could, for example, operate the valve at one-quarter crank-shaft speed and provide two of the passages 43 for each of the cylinders.

In the operation of the engine described, the rotation of the valve serves to control in proper manner the connection of each cylinder with its associated inlet and exhaust ports. During engine operation, the oil transmitted under pressure by the pump 22 through the pipe 23 to the vessels 20 serves to exert, through the bearings 18, a considerable downward pressure upon the shaft 17 and the valve 16, thus acting to hold the valve firmly in contact with its seat. In this connection, I find that the oil-containing recesses 31, by reducing the bearing area between the valve and the bore in which it is disposed, serve to increase the effectiveness of the seal by insuring that the valve will contact the bore-surface at points close to the cylinder ports. The flexibility of the side walls of the vessels 20 permit such radial expansion of those vessels as is necessary to permit them to exert the desired downward force upon the bearings 18. By adjusting the valve 24, the pressure maintained within the vessel and the force with which the valve 16 is seated, may be varied as desired.

As indicated above, I find carbon of the type used in electric-furnace electrodes to be a highly suitable material for the valve 16. The wearing qualities of this material can be increased manyfold if it is first impregnated with lubricating oil. To secure this impregnation, I immerse the valve in oil and maintain it therein until it is thoroughly saturated, the point of saturation being determined by repeated weighings of the valve. The oil used is preferably an oil of relatively high flash point—say in the neighborhood of 700° F. The impregnation of the carbon valve is desirably carried out at elevated temperature and at a pressure in the neighborhood of 500 pounds per square inch. Under these conditions the carbon valve will absorb oil up to about 30 percent of its weight.

I claim as my invention:

1. In an internal combustion engine, a cylinder, a rotary valve, a cylinder-head provided with a bore for the reception of said valve and with a cylinder port providing communication between said bore and the cylinder, and means responsive to fluid pressure for forcing said valve into contact with the wall of said bore adjacent said port, said means comprising a closed flexible-walled liquid container, and means for supplying liquid under pressure to said container.

2. In an internal combustion engine, a cylinder, a rotary valve, a cylinder-head provided with a bore for the reception of said valve and with a cylinder port providing communication between said bore and the cylinder, and means responsive to fluid pressure for forcing said valve into contact with the wall of said bore adjacent said port, said means comprising two closed flexible-walled containers spaced apart axially of said valve and disposed on opposite sides of said cylinder, and means for supplying liquid under pressure to said container.

3. In an internal combustion engine, a cylinder, a cylinder-head, a rotary valve, said cylinder-head being provided with a valve-receiving bore and with a cylinder port providing communication between said bore and the cylinder, means responsive to fluid pressure for forcing said valve into contact with the wall of said bore adjacent said port, and a pump supplying liquid under pressure to said fluid-pressure responsive means, said pump being driven by said engine whereby the force exerted on said valve by said fluid-pressure responsive means will vary with engine speed.

4. The invention set forth in claim 3 with the addition of means for limiting to a predetermined maximum the unit pressure of fluid supplied to said fluid-pressure responsive means.

ERWIN G. BAKER.